Patented May 14, 1940

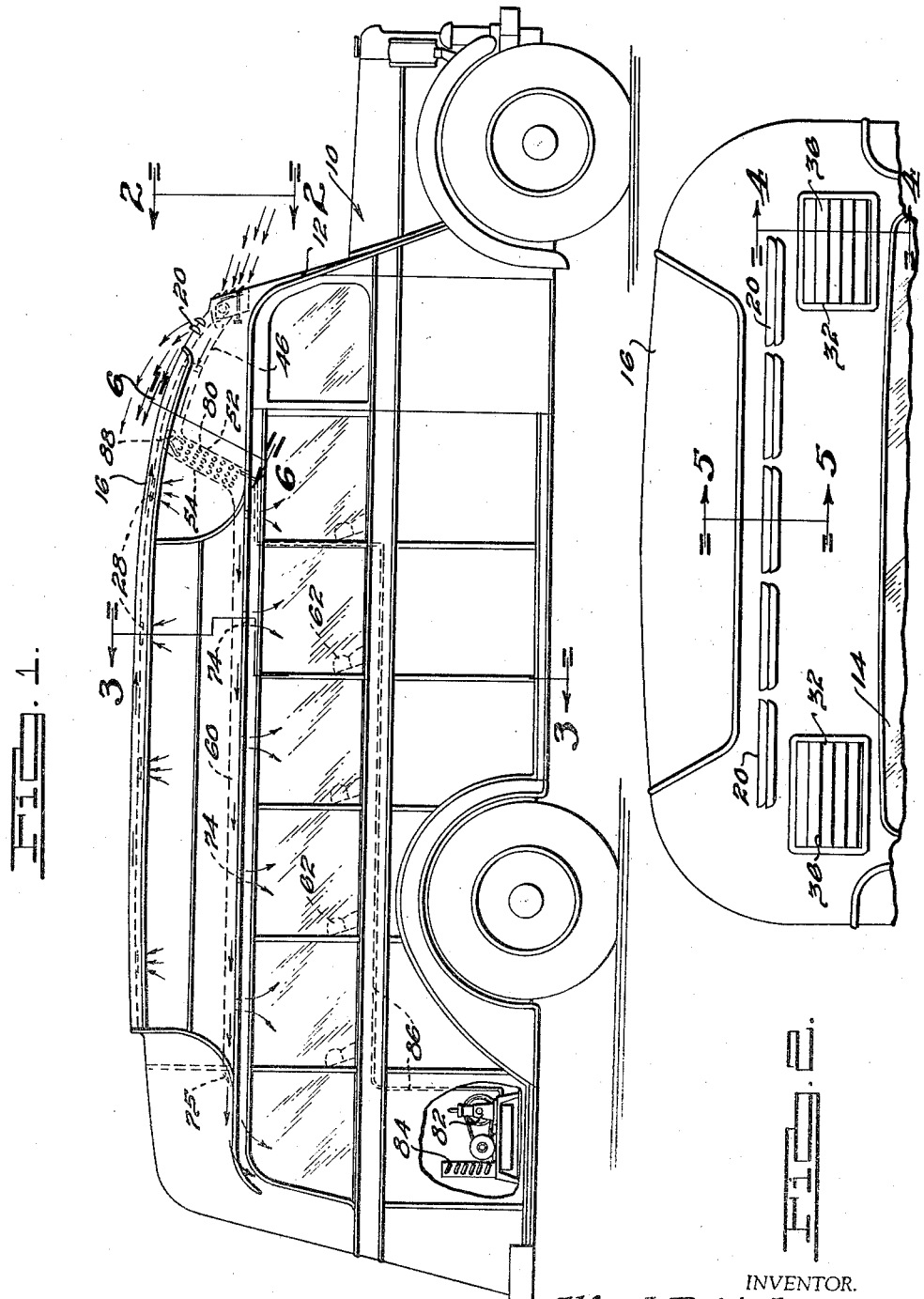

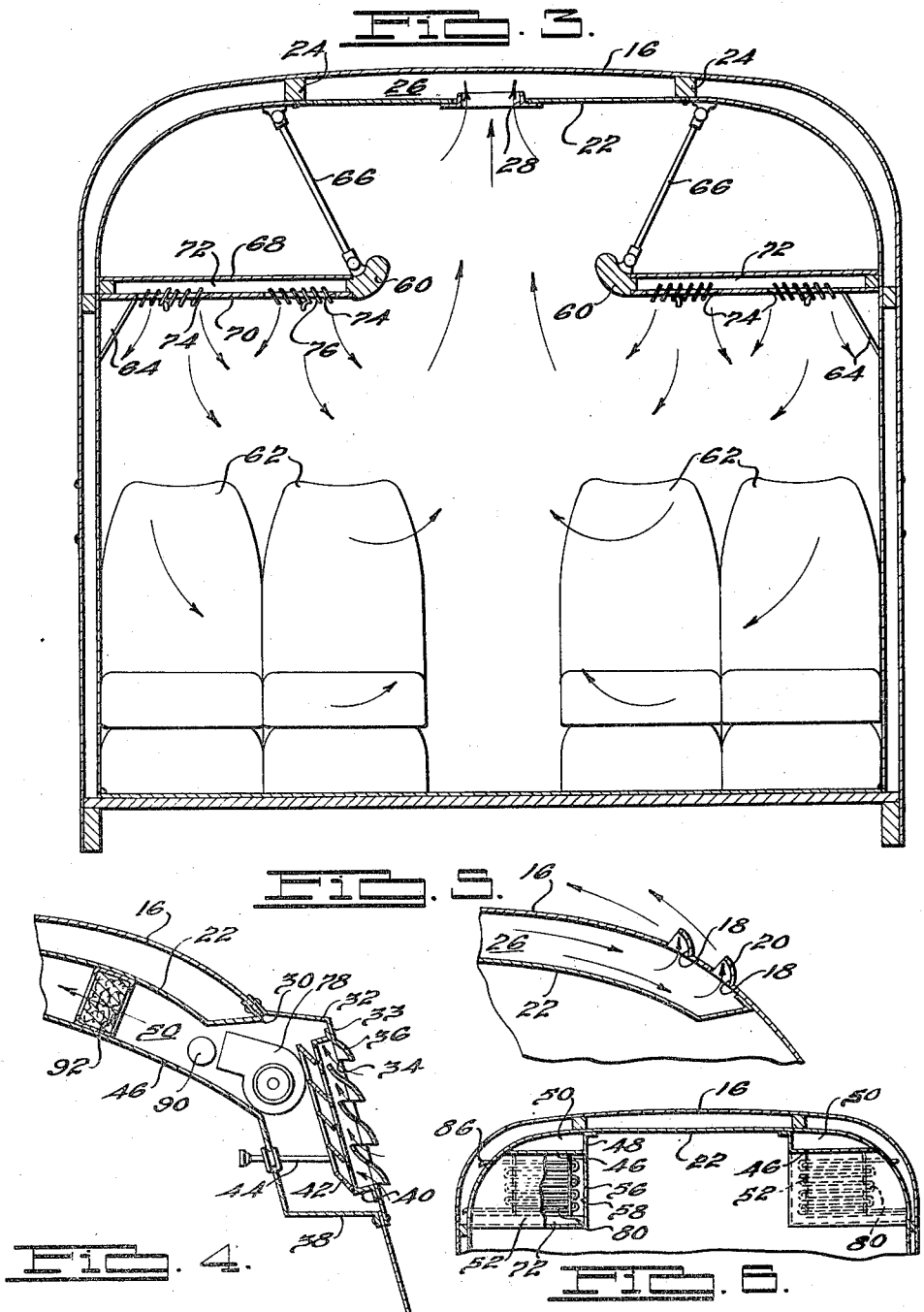

2,200,992

UNITED STATES PATENT OFFICE 2,200,992

VEHICLE VENTILATING AND AIR CONDITIONING APPARATUS

Alfred R. Lintern, Detroit, Mich., assignor to Evans Products Company, Detroit, Mich., a corporation of Delaware Application January 6, 1937, Serial No. 119,219

7 Claims. (Cl. 98—2)

This invention relates to vehicle ventilating apparatus and in particular relates to structure for ventilating the interior of large passenger vehicles.

Objects of the invention are to provide simplified structures for ventilating the interior of large passenger vehicles whereby an adequate supply of fresh air is furnished to the interior of the vehicle body and the volume directed to each of the passengers is controlled by the individual passengers; to provide an improved ventilating structure for large passenger vehicles which may be installed with a minimum of alteration by utilizing the walls and members forming the conventional vehicle structure to provide the air channels; to provide a simplified structure by which air entering the vehicle may be cleaned and tempered for the comfort of the passengers; to provide a simplified ventilating structure whereby air in adequate amounts may be supplied to the interior of the vehicle body whether the vehicle is in motion or at rest; to provide ventilating structures by which fresh air is properly circulated within the passenger compartment of a vehicle for the comfort of all of the passengers of the vehicle; and to provide a simplified ventilating structure economical to manufacture and efficient in operation.

Other objects of the invention will become apparent from the following specification, the drawings relating thereto, and from the claims hereinafter set forth.

In the drawings in which like numerals are used to designate like parts in the several views throughout;

Figure 1 is a side elevational view with parts broken away of a vehicle embodying features of the present invention;

Fig. 2 is a partial front elevational view taken substantially in the direction of the arrows 2—2 of Fig. 1;

Fig. 3 is a partial cross sectional view taken substantially along the line 3—3 of Fig. 1;

Fig. 4 is a partial cross sectional view taken substantially along the line 4—4 of Fig. 2;

Fig. 5 is a partial cross sectional view taken substantially along the line 5—5 of Fig. 2, and Fig. 6 is a partial cross sectional view with parts broken away taken substantially along the line 6—6 of Fig. 1.

In passenger vehicles, and particularly in large passenger buses, it is required by law that adequate volumes of fresh air be supplied the passenger compartment of the vehicle and the vitiated air exhausted therefrom; and it is further desirable to condition the air entering the vehicle for the comfort of the passengers. The present invention provides a structure whereby the air entering the vehicle may be tempered either by cooling or heating and distributed evenly throughout the entire interior of the vehicle body.

According to the present invention those portions of the vehicle structure forming parts of a conventional vehicle body are utilized to provide the exhaust and inlet ducts so that a minimum of alterations are necessary to adapt conventional vehicle structures to the present ventilating structure. An exhaust duct is provided substantially centrally of the vehicle body within the roof structure formed by the conventional inner and outer roof panels, the inner roof panel being provided with longitudinally spaced openings therethrough communicating with the interior of the passenger vehicle at spaced intervals throughout its length. Conventional vehicle buses are provided with trunk racks extending longitudinally of the vehicle at each side thereof above the seats, and these trunk racks are utilized to provide the inlet ducts for fresh air. Openings are provided through the under panel of the trunk rack, preferably above each of the passenger seats, and each of these openings is provided with an air flow control means whereby each passenger may control the direction and volume of air flow in his immediate vicinity.

By the use of air cooling means located in the path of the fresh air entering the vehicle body the temperature within the body may be maintained at a temperature lower than the outside air. Further by the use of blowers within the inlet ducts air may be supplied the interior of the vehicle whether the vehicle is at rest of in motion.

For a better understanding of the invention reference may be had to the drawings in which a large passenger vehicle 10 is illustrated having a front wall 12 including a windshield 14 extending upwardly and merging with the outer roof panel 16 of the roof structure. The outer roof panel 16 curves downwardly adjacent the front thereof merging with the front wall 12 and is provided with openings 18 therethrough extending across the front of the vehicle to provide air exhaust openings. Louvres 20 are preferably provided over the openings 18.

The inner roof panel 22 of the vehicle is spaced from the outer roof panel 16, and longitudinally extending frame members 24 form with the outer roof panel 16 and inner roof panel 22 a longitudinally extending exhaust duct 26, preferably located at substantially the center of the vehicle roof. Longitudinally spaced openings 28 are provided in the lower roof panel 22 communicating the exhaust chamber 26 with the interior of the passenger vehicle for exhausting air therefrom in a manner to be described hereinafter in detail.

To provide for the intake of fresh air into the vehicle body, openings 30 are provided in the front wall 12 adjacent the sides thereof above the windshield 14. A grille member 32 is positioned over each of the openings 30 and has an upstanding front face 33 which preferably lies in a plane substantially flush with the plane of the front wall 12. The front face 33 is provided with a plurality of transversely extending openings 34 therethrough having downwardly directed louvres, or projecting lips 36 associated therewith for the purpose of directing the fresh air into the inlet ducts.

A header member 38 is mounted interiorly of the vehicle immediately behind each opening 30 and provides a closed chamber behind the inlet openings. An air flow control member 40 is preferably mounted on the inner face of the front wall 33 immediately behind the openings 34 and has associated therewith a plurality of transversely extending pivoted shutter members 42 located behind each of the openings 34 respectively. A control member 44 is operatively connected to the shutter members 42 and extends inwardly into the passenger compartment, so that it may be conveniently operated to control the positions of the shutters 42 to thereby control the volume of fresh air entering the inlet ducts.

A panel member 46 having an upstanding inner side wall 48 co-operates with the inner roof panel adjacent the side thereof and is joined with the header member 38 to provide a portion 50 of an air inlet channel at each side of the vehicle.

Spaced members 52 and 54 with a wall member 56 form with the downwardly curved side portions of the inner roof panel 22 another portion 58 of one of the inlet ducts at each side of the vehicle in line communicating with the portions 50 respectively.

Storage compartments or trunk racks 60 are utilized to provide air inlet distribution ducts for distributing the fresh air throughout the passenber compartment. The storage racks 60 extend longitudinally of the vehicle interiorly thereof at each side of the vehicle in a position immediately above the passenger seats 62. Bracket members 64 are secured to the inner side walls of the vehicle and engage the trunk racks 60 at longitudinally spaced intervals therealong adjacent the outer edge thereof, and bracing members 66 engage the inner roof panel 22 and engage the storage racks 60 adjacent the inner ends thereof at longitudinally spaced intervals therealong to properly position and support the storage rack within the vehicle.

Each stroke rack 60 comprises an upper panel member 68 and a lower panel member 70 spaced therefrom to provide an air distribution channel 72 therebetween. The lower panel member 70 is provided with a plurality of spaced openings 74 therethrough, and preferably there is one of such openings immediately above each of the seats 62. Adjustable shutter members 76 are provided within each of the openings 74 to control the direction and volume of air passing therethrough into the passenger compartment. By suitably controlling the position of the shutters 76 the openings 74 may be entirely closed or may be opened to the degree desired and the shutters may be positioned to direct the air passing through the openings 74 either away from or toward the passenger occupying the seat below the partiticular opening.

The channel or duct 72 may also discharge through openings 75, having suitable shutter controls, at the rear of the channel if desired. The structure for the inlet ducts at each side of the vehicle is the same so that the description of one suffices for both.

The operation of the mechanism so far described is that as the bus moves forwardly the oncoming fresh air strikes the front wall 12 and passes upwardly thereover. A portion of this fresh air is caused to pass through the inlet openings 34, by the louvres 36, and passes through the inlet conduits 50 and 58 into the distribution ducts 72 from whence it is passed into the interior of the vehicle through the openings 74. The vitiated air is caused to pass upwardly through the openings 28 into the exhaust duct 26 from whence it passes through the exhaust opening 18.

The exhaust openings 18 are located in a position adjacent the front of the vehicle roof immediately above the front wall 12; and as the onrushing stream of air strikes against the front wall and passes upwardly thereover and over the roof structure, a low pressure area is created immediately adjacent the openings 18 causing the air to be withdrawn from the interior of the vehicle. The arrows in Figs. 1 and 3 indicate the path of air circulating within the vehicle body.

For conveying air into the car through the inlet passages, particularly when the vehicle is not in motion, air blowers 78 are preferably mounted within each of the header members 38. These blowers may of course also be used to increase the volume of air supplied to the interior of the vehicle when the vehicle is in motion, if desired.

According to the present invention in order to reduce the temperature of the air within the vehicle compared to the outside air temperature, cooling means are provided in the inlet ducts. These cooling means may be of any conventional structure, and in the illustrated embodiments the cooling means comprises evaporating coils 80 preferably located in the duct portion 58. A conventional compressor 82 and condenser 84 are preferably located as a unit within the compartment adjacent the rear of the vehicle. A conduit or pipe 86 carries the liquid refrigerant to its coil 80 through an expansion valve 88, and a similar conduit or pipe returns the refrigerant to the condenser and compressor from whence it is re-circulated through the pipe 86. It is pointed out that an evaporator and compressor unit may be provided for each of the coils 58 or a single unit serving each of the cooling coils may be used.

It is pointed out that for the comfort of the passengers it is not necessary to maintain a constant minimum temperature, but that it is merely necessary to maintain the temperature of the passenger compartment at a slightly lower temperature than that of the outside air. For example, a relative temperature differential of approximately 10 degrees is sufficient for obtaining passenger comfort, and does not subject the passenger to discomfort when changing from the interior of the bus to the outside or from the outside to the interior of the bus.

In order to heat the fresh air entering the bus, and particularly to remove the chill therefrom so that cold air is not directed against the passengers, a heating element 90 is preferably provided within the inlet ducts in the top of the fresh incoming air. Such a heater 90 may be of the conventional hot water or exhaust types of heaters.

Removable air cleaning elements 92 of fibrous material, such as glass or mineral wool, are also preferably provided within the inlet ducts for the purpose of removing dust and other foreign materials from the air, so that the air entering the passenger compartment is in a clean condition.

Formal changes may be made in the specific embodiment of the invention described without departing from the spirit and substance of the invention, the scope of which is commensurate with the appended claims.

What is claimed is:

1. Apparatus for ventilating the interior of a closed passenger vehicle body having an outer roof and a front wall including a windshield and said vehicle body having seats therein at spaced intervals along each side thereof comprising means forming air inlet openings in said body adjacent the sides of said front wall, means forming exhaust openings in the roof of said body adjacent the front thereof, means forming an elongated exhaust conduit in the roof structure of said vehicle, located centrally of said vehicle and having spaced openings therethrough communicating with the interior of said vehicle body, said exhaust conduit communicating with said exhaust openings, members extending longitudinally of said vehicle body forming air inlet conduits, said members being located at each side of said vehicle body interiorly thereof over said seats in spaced relation to the roof and having downwardly directed spaced openings therethrough communicating said conduits with the interior of said body, the space between the members and the roof being open to the interior of the vehicle, and means communicating said inlet conduits with said inlet openings.

2. Apparatus for ventilating the interior of a closed passenger vehicle body having an outer roof and a front wall including a windshield and said vehicle body having transversely extending seats therein at spaced intervals along each side thereof comprising means forming air inlet openings in said body adjacent the sides of said front wall, means forming exhaust openings in the roof of said body adjacent the front thereof, means forming an elongated exhaust conduit in the roof structure of said vehicle located centrally of said vehicle and having spaced openings therethrough communicating with the interior of said vehicle body, said exhaust conduit communicating with said exhaust openings, substantially flat horizontal members extending longitudinally of said vehicle body forming air inlet conduits adjacent each side of the vehicle body interiorly thereof over said seats and being spaced from the roof to serve as luggage supports, the spaces between the members and the roof being open to the interior of the vehicle, said members having longitudinally spaced, downwardly directed openings therethrough communicating said conduits with the interior of said body, means to control the flow of air through each of said last-named openings, and means communicating said inlet conduits with said inlet openings.

3. Apparatus for ventilating the interior of a closed pasenger vehicle body having an outer roof and a front wall including a windshield and said vehicle body having seats therein at spaced intervals along each side thereof comprising means forming air inlet openings in said body adjacent each side of said front wall, means forming exhaust openings in the roof of said body adjacent the front thereof, means forming an elongated exhaust conduit in the roof structure of said vehicle, located centrally of said vehicle and having spaced openings therethrough communicating with the interior of said vehicle body, said exhaust conduits communicating with said exhaust openings, substantially flat horizontal members extending longitudinally of said vehicle body forming air inlet conduits adjacent each side of said vehicle body interiorly thereof over said seats in spaced relation to the roof, the space between the members and the roof being open to the interior of the vehicle, the members forming each of said conduits having downwardly directed, longitudinally spaced openings therethrough communicating said conduit with the interior of said body, means controlling the direction and volume of air passing through each of said last-named openings, and means communicating said inlet conduit conduits with said inlet openings.

4. Apparatus for ventilating the interior of a closed passenger vehicle body having an outer roof and a front wall including a windshield and said vehicle body having seats therein at spaced intervals along each side thereof comprising means forming air inlet openings in said body adjacent each side of said front wall, means forming air ejector openings in the roof of said body adjacent the front thereof, means forming an elongated exhaust conduit in the roof structure of said vehicle located substantially centrally of said vehicle and having spaced openings therethrough communicating with the interior of said vehicle body, said exhaust conduits communicating with said exhaust openings, substantially flat horizontal members extending longitudinally of said vehicle body forming air inlet conduits adjacent each side of said vehicle body interiorly thereof over said seats in spaced relation to the roof, the space between the members and the roof being open to the interior of the vehicle, the members forming each of said conduits having downwardly directed longitudinally spaced openings therethrough communicating said conduits with the interior of said body, means forming separate chambers communicating each of said inlet conduits with said side inlet openings respectively, cooling means positioned within each of said chambers, and blowers located within each of said chambers.

5. Apparatus for ventilating the interior of a closed passenger vehicle body having a front, a roof, and upright side walls and having a row of seats for two side-by-side passengers along each side therein to form an open inner aisle, comprising air inlet opening means in the upper front portion of said body, means in the roof structure of said vehicle forming centrally located and longitudinally spaced exhaust openings communicating with the interior of said body over said aisle, means communicating said exhaust openings with the exterior of said body, members forming air inlet ducts extending longitudinally along each side of the body and extending inwardly over the greater portion of the widths of said rows of seats, means communicating the forward ends of said ducts with said air inlet opening means, the under surfaces of said duct members having discharge openings communicating said ducts with the interior of said body over said rows of passenger seats, the upper portions of said longitudinally extending duct members forming generally horizontal wide surfaces spaced well below the lower surfaces of the body roof structure, and the space between said ducts and roof being open to the interior of the vehicle body and substantially unobstructed so that said duct members also form baggage racks readily accessible from said aisle.

6. Apparatus for ventilating the interior of a closed passenger vehicle body having a roof and upright side walls and having a double row of side-by-side passenger seats along a side therein, comprising a wide air supply duct extending longitudinally along said side of the body immediately over said double row of seats and extending substantially horizontally inwardly from adjacent the vehicle side walls over the greater part of the width of said double row of seats, means to supply ventilating air to said duct, the under surface of said duct having an air discharge opening above each of said seats of said row communicating said ducts with the interior of said body relatively close above the heads of each of the passengers seated in said row, said ducts having a wide, substantially flat top spaced materially below the lower surfaces of the roof structure, and the space between said duct and the roof being open to the interior of the bus and substantially unobstructed so that said duct also forms a readily accessible baggage rack.

7. Apparatus for ventilating the interior of and cooling the passengers in a closed passenger bus body having a roof and upright side walls and having a row of transversely extending seats for two forwardly facing passengers along each side thereof, comprising means including two closely and vertically spaced, flat, substantially horizontal members extending longitudinally along and inwardly from the upper portion of the bus side walls and forming wide, thin, air supply ducts extending inwardly over the great part of the width of each row of seats for said two passengers and relatively close above the seated passengers' heads, means to supply cooled air to said ducts, each lower flat member having two laterally spaced rows of longitudinally spaced, downwardly directed openings forming a discharge opening in the lower surface of each duct for each passenger's seat relatively close above the seated passenger's head, the outer portions of said ducts being secured to the adjacent bus side walls, longitudinally spaced members of relatively small cross section supporting the inner portions of said ducts, the upper flat member of each duct being spaced well below the lower surfaces of the bus body roof structure and the space thus formed being open to the interior of the bus and substantially unobstructed so that said ducts also form rigid and readily accessible baggage racks.

ALFRED R. LINTERN.